US010289775B1

(12) United States Patent
Wilson et al.

(10) Patent No.: US 10,289,775 B1
(45) Date of Patent: May 14, 2019

(54) SYSTEMS AND METHODS FOR ASSIGNING CLOCK TAPS BASED ON TIMING

(71) Applicant: Cadence Design Systems, Inc., San Jose, CA (US)

(72) Inventors: Brian Wilson, San Jose, CA (US); Charles Jay Alpert, Cedar Park, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 14 days.

(21) Appl. No.: 15/694,309

(22) Filed: Sep. 1, 2017

(51) Int. Cl.
*G06F 17/50* (2006.01)

(52) U.S. Cl.
CPC ........ *G06F 17/5031* (2013.01); *G06F 17/505* (2013.01)

(58) Field of Classification Search
CPC .......................... G06F 17/5031; G06F 17/505
USPC .................................................. 716/102–103
See application file for complete search history.

(56) References Cited

U.S. PATENT DOCUMENTS

| | | | |
|---|---|---|---|
| 8,572,532 B1 | 10/2013 | Singh et al. | |
| 8,631,378 B2 | 1/2014 | Lasher et al. | |
| 8,799,846 B1 | 8/2014 | Berry et al. | |
| 8,806,413 B2 | 8/2014 | Shaikh et al. | |
| 8,887,114 B2 | 11/2014 | Hill et al. | |
| 2012/0176157 A1* | 7/2012 | Peng | G06F 17/505 326/93 |
| 2013/0219352 A1* | 8/2013 | Ishikawa | G06F 17/5068 716/108 |
| 2014/0282339 A1* | 9/2014 | Hill | G06F 17/5072 716/122 |

* cited by examiner

*Primary Examiner* — Stacy Whitmore

(74) *Attorney, Agent, or Firm* — Schwegman Lundberg & Woessner, P.A.

(57) ABSTRACT

Various embodiments described herein assign, within a circuit design, a clock tap to a clock device (e.g., flip-flop) to improve timing of a path between the clock tap and the clock device. In particular, some embodiments identify which clock devices should be assigned to a clock tap so as to improve final timing as seen under an on-chip variation timing analysis, such an AOCV/CPPR (advanced on-chip variation/common clock path pessimism removal) timing analysis. Some such embodiments may achieve this by identifying, after post-route-optimization, critical clock-tap-to-clock-device assignments based on timing analysis results (e.g., from AOCV/CPPR timing analysis) and feeding back those critical clock-tap-to-clock-device assignments to a process performing new clock tap assignments.

19 Claims, 6 Drawing Sheets

SYSTEMS AND METHODS FOR ASSIGNING CLOCK TAPS BASED ON TIMING

TECHNICAL FIELD

This application relates to circuit design and, more particularly, to systems, methods, devices, and instructions for assigning clock taps in a circuit design based on timing.

BACKGROUND

As a part of designing a circuit, such as an integrated circuit (IC) circuit, an electronic design automation (EDA) software system commonly performs generation of a clock tree, which uses a branching network to distribute a clock signal from a clock signal source to a plurality of clock sinks within a circuit design. The clock sinks usually comprise clock sinks in the circuit design that require a clock signal to operate, such as flip-flops. The branching network forming the circuit is comprised of nodes connected by nets.

One style for clock-tree design is to have a portion of the clock-tree be highly structured. This highly structured portion is given preferential circuit resources so that it may have improved performance, power or yield attributes. Examples of such structured circuits are H-trees, meshes and fishbones. These circuits are designed such that the delay from the source node to a plurality of clock tapping point nodes (hereafter, clock tap) is such that delay is closely matched. Each circuit path from the source to the tap-point is logically equivalent such that any clock tap can be logically used to connect to the remaining clock circuit to a specific sink. The choice of clock tap will impact performance to a sink and thus the performance of the IC.

The remaining portion of each circuit to each clock sink will be comprised of additional nodes. Those nodes may exist solely to meet electrical requirements, or for managing the delay of the circuit to each sink. Such nodes are usually inverters or buffers. Other nodes may have a logical or control function in the path to a sink, a common element is a clock-gate or integrated clock gate (ICG) which is used to turn off the clock sinks and logic paths they contribute to. Under designed specific conditions, a final circuit resulting from the given circuit design can use an ICG to turn off a cluster of clock sinks (e.g., flip-flops) if the cluster is not required for certain operations of the final circuit for the active operation of the IC. In this way, the ICG can permit the final circuit to save power that would otherwise be consumed by the cluster had it not been gated from the clock tap by the ICG. ICGs themselves are power and area expensive. If too many copies of logically equivalent ICGs are made this will negatively impact power.

Multiple sinks may have common ICG and logic conditions. If such sinks are assigned to a plurality of tap-points, the clock gate and logic will have to be replicated for each tap. Once an assignment of a sink to a clock tap is made and necessary ICGs and logic is duplicated, each clock tap will form a plurality of subordinate clock trees. This plurality of subordinate clock trees may be collectively referred to as a source group and shares common clock optimization goals and constraints.

Conventional clock tap assignment is performed before clock tree synthesis of the subordinate clock trees. In a multi-clock source context, conventional clock tap assignment process is based on geometric distance, where each clock sink is assigned to a nearest clock tap using a "nearest neighbor" approach this approach will optimize the performance of the subordinate clock tree. Additionally, conventional clock tap assignment may consider further away taps to reduce ICG count while maintaining reasonable clock tap-to-clock sink path length and clock tap fanout.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
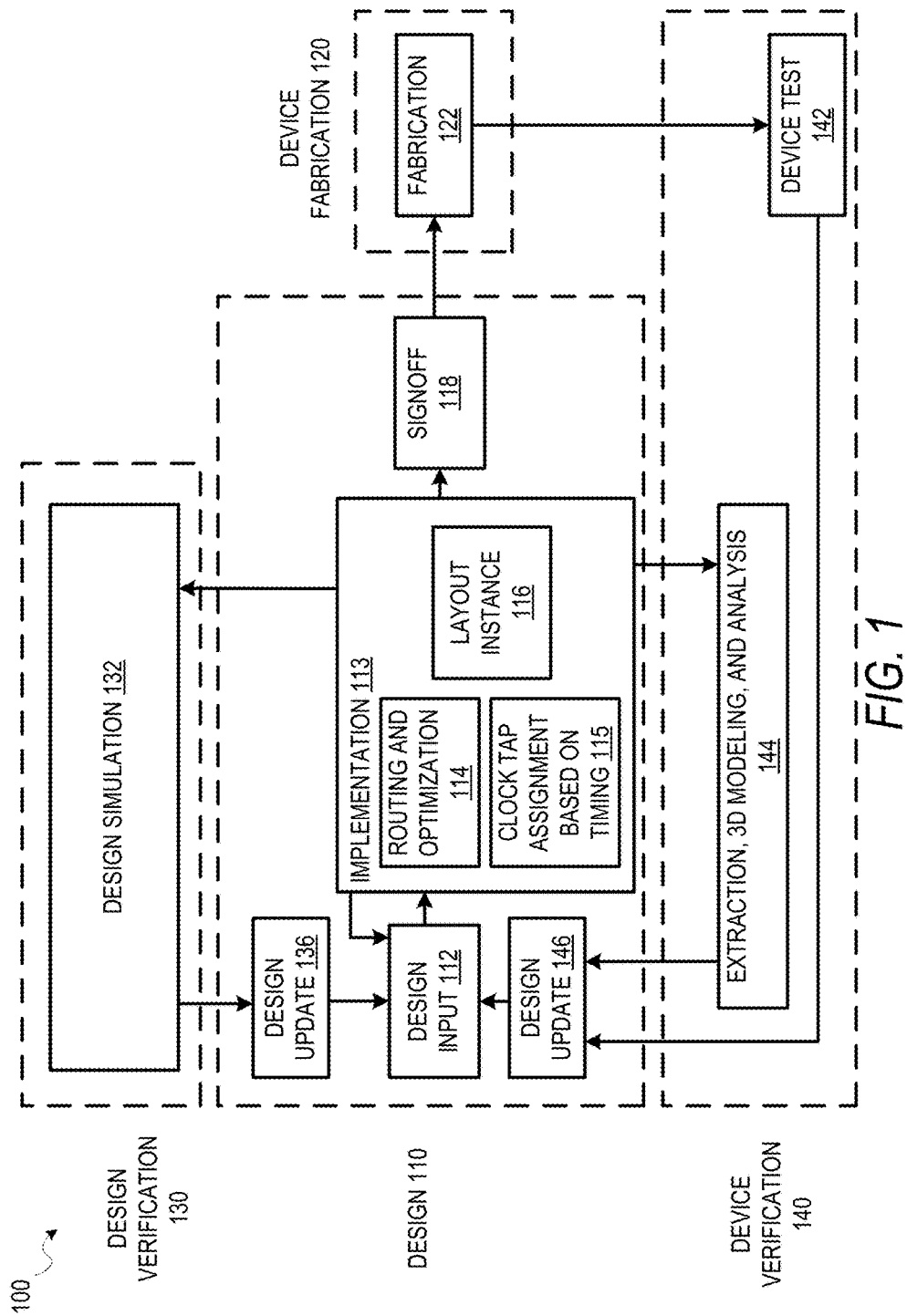
FIG. 1 is a diagram illustrating an example design process flow for clock tap assignment based on timing, according to some embodiments.

Clock tree design is a major step in circuit (e.g., integrated circuit) physical design, as it can significantly affect the performance and power consumption of the circuit design. In circuit designs including multiple clock sources, the act of assigning a clock sink that is a circuit device (e.g., flip-flop) to a tapping point to a particular clock source can influence a clock tree's power use and timing of circuit paths controlled by clock sources. Usually, conventional methods for assigning clock sinks to tapping points are performed before clock tree synthesis (CTS) and do not take into account detailed timing effects, instead assuming that minimizing distance to the tap is a proxy for timing performance. Additionally, timing effects (e.g., due to process variation) within a circuit design usually become significant towards the end of a circuit design flow, such as after routing and post-routing optimization.

Various embodiments described herein assign, within a circuit design, a clock tap to a clock device (e.g., flip-flop) to improve timing of a path between the clock tap and the clock device. By improving timing of a path between a clock tap and a clock device, some embodiments increase the maximum frequency of the path in a final circuit between that flip-flop and another flip-flop resulting from the circuit design, which in turn can improve the maximum frequency of the overall final circuit. In particular, some embodiments identify which clock devices (e.g., flip-flops) should be assigned to a clock tap so as to improve final timing as seen under an on-chip variation timing analysis, such as AOCV (advanced on-chip variation) which penalizes uncommon portions of clock paths to model process derating to account for on-chip variation due to fabrication process variation. Timing analysis can describe how much of this penalty to remove from clock path analysis for common portions of the clock. The magnitude of this penalty reduction is called common path pessimism removal (CPPR). Some such embodiments may achieve this by identifying, after postroute-optimization, critical clock-tap-to-clock-device assignments (e.g., flip-flop assignments) based on timing analysis results (e.g., from AOCV/CPPR timing analysis) and feeding back those critical clock-tap-to-clock-device assignments to a process performing new clock tap assignments. The timing results may comprise path-to-path timing analysis, which can permit some embodiments to identify clock sinks of the circuit design that are missing their respective timing targets (e.g., as defined by a design constraint). The process performing the new clock tap assignments may maintain a record of non-critical clock-tap-to-clock-device assignments so as to distinguish them from the critical clock-tap-to-clock-device assignments, which can provide stability for critical clock-tap-to-clock-device assignment purposes.

According to some embodiments, flip-flop-to-flip-flop connections are adjusted or optimized within a circuit design to minimize a timing impact according to a timing analysis, such as an advanced on-chip variation (AOCV) timing analysis. Some such embodiment may achieve this by analyzing critical timing paths of clock trees after CTS, and addressing clock tap assignments of clock sink pairs (e.g., flip-flop pairs) in the circuit design that are assigned under different clock taps. The clock device pairs may suffer a CPPR timing analysis penalty, AOCV timing analysis penalty, or both, due to being assigned to different clock gate instances by prior circuit design operations (e.g., CTS). The clock tap assignments of clock sink pairs may be updated and re-optimized based on critical timing paths, while non-critical clock tap assignments are maintained (e.g., to provide solution stability).

According to an embodiment, a method is implemented that accesses (e.g., receives) a circuit design (e.g., netlist file of the circuit design) including a clock tree. Accordingly, the method may be performed on a circuit design subsequent to a CTS process and, additionally, may be performed after a clock tree optimization process either after CTS or concurrent clock optimization (e.g., CCOPT). As inputs, the method may also access (e.g., receive) at least one of a critical-slack-threshold value (S) and a maximum clock-sink-to-clock-tap distance value (D). Initially, the method may cache clock tap assignments for each clock sink (e.g., flip-flop) in the circuit design that is currently assigned to a clock tap, thereby producing a set of cache tap assignments for those clock sinks. This may be performed before the method begins a primary operation loop.

During a primary operation loop, the method may then perform one or more of the operations for each clock sink pair (e.g., flip-flop pair) within the circuit design, where each clock sink pair comprises at least two clock sinks of the circuit design that are coupled (e.g., wired) together. The method may perform the one or more operations for each clock sink pair according to an order determined by a timing analysis (e.g., AOCV/CPPR timing analysis). Additionally, the method may perform the one or more operations only for those clock sink pairs in the circuit design that have a slack at least below a critical-slack threshold value (S).

The one or more operations of the primary operation loop may comprise determining whether a first clock sink, in a current clock sink pair within the circuit design, is assigned to a first clock tap, and whether a second clock sink, in the current clock sink pair, is not assigned to any clock taps. In response to this determination, the method may assign the second clock sink to the first clock tap, thereby causing the first and second clock sinks to share the same clock tap.

The one or more operations of the primary operation loop may comprise determining whether a first clock sink, in a current clock sink pair within the circuit design, is assigned to a first clock tap, and whether a second clock sink, in the current clock sink pair, is also assigned to the first clock tap. In response to this determination, the method may maintain the clock tap assignments.

The one or more operations of the primary operation loop may comprise determining whether a first clock sink, in a current clock sink pair within the circuit design, is assigned to a first clock tap, and whether a second clock sink, in the current clock sink pair, is assigned to a second clock tap. In response to this determination, the method may find a particular clock tap that minimizes, for the first and second clock sinks of the current clock sink pair, the longest of the circuit-device-to-clock-tap distances, and may assign the first and second clock sinks to the particular clock tap. In some instances, the method may assign the first and second clock sinks to the particular clock tap only if each of the circuit-device-to-clock-tap distance between the first clock sink and the circuit-device-to-clock-tap distance between the second clock sink is at least less than a maximum circuit-device-to-clock-tap distance value (D).

Following the primary operation loop, the method may assign clock taps to clock devices that remain unassigned by applying the tap assignments cached prior to the primary operation loop. The clock tap assignments resulting from the method may be fed back to, and utilized by, another run of the clock tree synthesis (CTS) process. Thereafter, the method may be performed again on the circuit design resulting from the other run of the CTS. This feedback loop may continue until a certain set of user-defined criteria is satisfied, which may include a criterion relating to ICG count, wire length (WL), insertion delay, or a timing analysis impact. In this way, the method for assigning clock taps may perform multiple passes over a clock tree design (e.g., clock tree design optimized by CCOPT).

A method described herein for assigning clock taps based on timing may be part of a global method for generating a clock tree. The global method may use a method for assigning clock taps based on timing (as described herein) to consider and address the factor of circuit-device-to-circuit-device connections (e.g., flip-flop-to-flip-flop connect) by minimizing the timing impact (e.g., AOCV impact) clock tap assignments within the clock tree.

For some embodiments, the global method may further consider and address other factors with respect to the generated clock tree. For instance, the global method may consider and address the factor of logic hierarchy of the clock tree by attempting to minimize clock gate (e.g., ICG) count, and may consider and address the factor of distance by attempting to minimize wirelength (WL) or by attempting to minimize insertion delays within the clock tree. For some embodiments, the factors considered and addressed by the global method are tunable such that the global method considers and addresses one factor (e.g., lowering power consumption by the clock tree) over another factor (e.g., addressing timing issues with respect to the clock tree). According to some embodiments, for clock sinks at all levels under the same logic clock gate (e.g., ICG) in the clock tree, the global method applies a min-cut-based clustering for initial seed clustering of clock sinks within the clock tree.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for generating a clock tree with buffers and inverters, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, and revisions are made based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in an implementation operation 113, which includes a routing and optimization 114 operation, an operation 115 for clock tap assignment based on timing in accordance with an embodiment, and generating a layout instance 116, along with any other automated design processes. Optimization 114 may occur prior to the layout instance 116, and routing, timing analysis, and optimization 114 may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Though not shown, the routing and optimization 114 operation can include a clock tree synthesis (CTS) operation, which can generate one or more clock trees that deliver clock signal from clock sources of a circuit design to a plurality of clock tree leaf nodes comprising clock tree sinks (e.g., flip-flops) within the circuit design. The routing and optimization 114 operation may also include other operations not shown, such as those relating to floorplanning, placement, post-placement optimization, and post-routing optimization. As shown, the routing and optimization 114 operation includes the operation 115 for clock tap assignment based on timing, in accordance with an embodiment. Operation 115 may be performed after a CTS operation and, in particular, may be performed after post-CTS optimization or after post-routing optimization.

Design inputs are used in the design input 112 operation. These may be further processed during the design input 112 operation via a process, such as logic-synthesis to generate a circuit netlist mapped to a target standard library manufacturable by the foundry in 122. This netlist is placed by the layout instance 116, optimized and routed by operation 114 and a clock tree is inserted by a CTS process. Operations 114, 115 and 116 may have a close interrelation and may be simultaneously optimized by processes similar to CCOPT. Prior to the routed, placed and optimized netlist being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or from the design input 112 operation may occur after the initial layout instance 116 is generated. In various embodiments, whenever design inputs are used to update or change an aspect of a circuit design, a timing analysis and the routing and optimization 114 operation may be performed.

Figure 2:
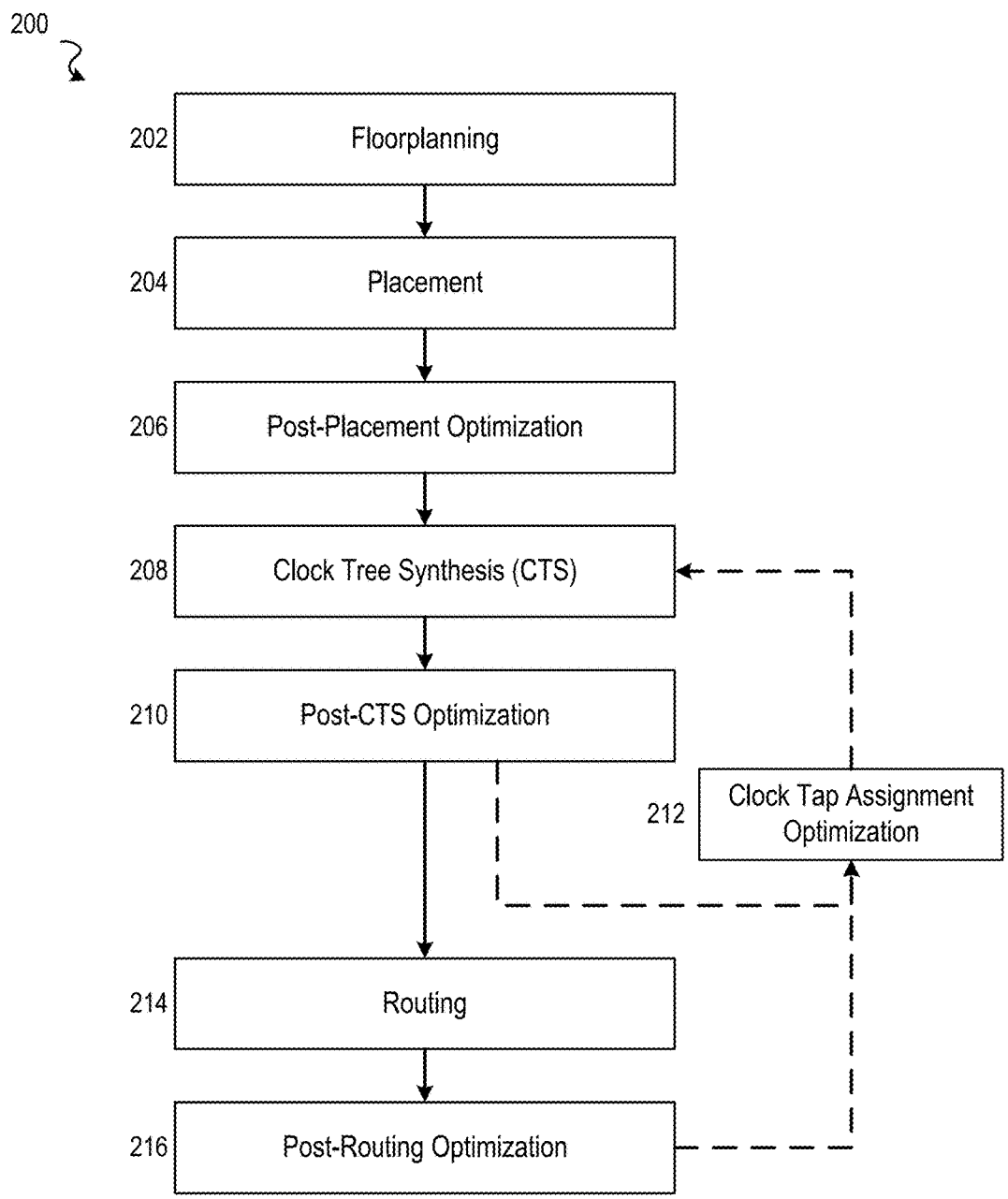
FIGS. 2-3 are flowcharts illustrating example methods for clock tap assignment based on timing, according to some embodiments.
Figure 3:
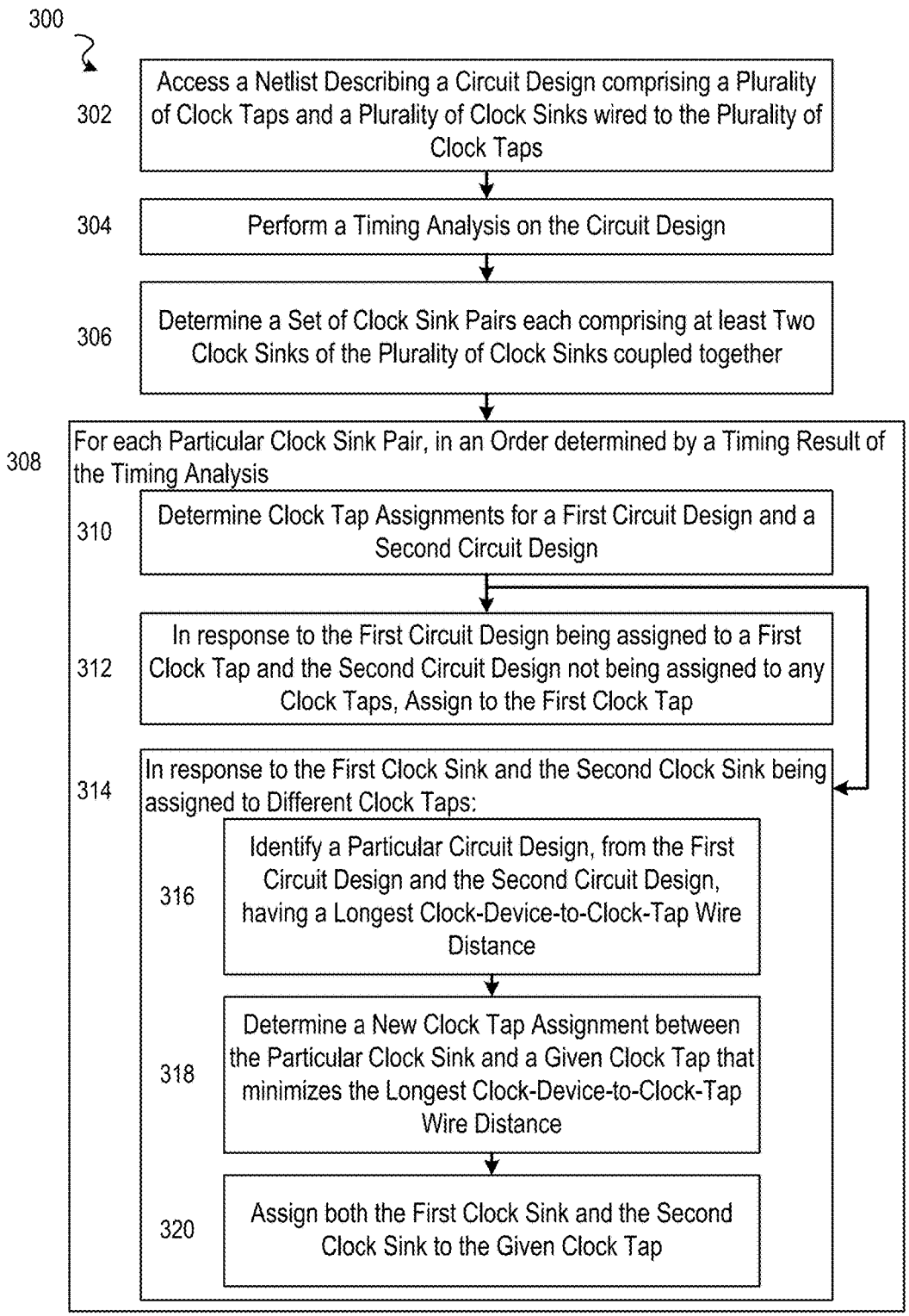

FIGS. 2-3 are flowcharts illustrating example methods for clock tap assignment based on timing, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Further, for some embodiments, a method described herein may have more or fewer operations than otherwise depicted.

Referring now to FIG. 2, the flowchart illustrates the example method 200 for clock tap assignment based on timing, according to some embodiments. In particular, the method 200 illustrates where, for some embodiments, clock tap assignment based on timing may be performed with respect to a circuit design process. An operation of the method 200 (or another method described herein) may be performed by a hardware processor (e.g., central processing unit or graphics processing unit) of a computing device (e.g., desktop, server, etc.).

The method 200 as illustrated begins with operation 202, where a floorplanning process of a circuit design is performed, which can determine a floorplan for the circuit design based on geometric constraints of the circuit design. The circuit design provided to floorplanning is generated by an input process that may comprise run logic synthesis to map the high-level description of the circuit function into a library of manufacturable circuits. The method 200 continues with operation 204, where a placement process of circuit design is performed. During the placement process, one or more functional blocks and circuit components of the circuit design are placed on the floorplan of the circuit design produced by operation 202. The method 200 continues with operation 206, where a post-placement optimization process of the circuit design is performed. During post-placement optimization, placement of functional blocks and circuit components may be adjusted to optimize, for instance, wire length, timing, congestion, or power usage. The method 200 continues with operation 208, in which a clock tree synthesis (CTS) process is performed, thereby generating a clock tree between clock sources and clock sinks within the circuit design. The method 200 continues with operation 210, where post-CTS optimization is performed on the clock tree generated by operation 208, such as clock current optimization (CCOPT).

From operation 210, the method 200 may continue with operation 214, where a routing process is performed on the circuit design. During the routing process, wires are added and routed on the floorplan to connect various components of the circuit design. From operation 214, the method 200 continues with operation 216, where a post-routing optimization process is performed. The post-routing optimization process may adjust wire routing within the circuit design to, for example, reduce the number of vias, reduce congestion, reduce crosstalk, or add or change sub-circuit elements to different sub-circuits with different timing characteristics and incrementally adjust wires.

Alternatively, for some embodiments, the method 200 may continue to operation 212 after either operation 210, operation 216, or both. At operation 212, a clock tap assignment optimization is performed on the clock tree generated by operation 208, which may include assigning clock devices to clock taps based on timing described herein. Additionally, operation 212 may attempt to minimize clock gate (e.g., ICG) count, minimize wirelength, and minimize insertion delays with respect to the clock tree generated by operation 208.

Referring now to FIG. 3, the flowchart illustrates the example method 300 for generating a clock tree for a circuit design, according to some embodiments. For some embodiments, the method 300 is performed as part of a placement and routing processing applied to a circuit design (e.g., by an EDA software system). Additionally, the method 300 may be performed after clock tree synthesis and, in particular, may be performed after post-CTS optimization or post-routing optimization. An operation of the method 300 (or another method described herein) may be performed by a hardware processor (e.g., central processing unit or graphics processing unit) of a computing device (e.g., desktop, server, etc.), thereby making the method 300 a computerized method. According to some embodiments, the method 300 involves generating clock-tap-to-clock-device assignments within a clock tree based on timing impacts (e.g., critical timing paths).

The method 300 as illustrated begins with operation 302 accessing (receiving or otherwise obtaining) a netlist describing a circuit design that comprises a plurality of clock taps and a plurality of clock sinks wired to the plurality of clock taps. For instance, the netlist may be accessed from a data storage device, such as a hard disk drive or random access memory (RAM), upon which it is currently stored.

The method 300 continues with operation 304 performing a timing analysis on the circuit design.

The method 300 continues with operation 306 determining a set of clock sink pairs, where each clock sink pair comprises at least two clock sinks (e.g., flip-flops) of the plurality of clock sinks that are coupled (e.g., wired) together. For some embodiments, the set of clock sink pairs is determined based on a critical-slack threshold value (S), where each clock sink pair in the set of clock sink pairs has a slack that is at least less than the critical-slack threshold value (S).

The method 300 continues with operation 308, where operation 310 through 314 are performed for each particular clock sink pair in the set of clock sink pairs, and in an order determined by a timing result of the timing analysis. According to some embodiments, the order, in which operation 308 loops over each clock sink pair, comprises a worst timing delay to a best timing delay between clock sinks. In this way, various embodiments can perform clock tap assignments on clock sink pairs based on criticality of clock paths. The timing analysis may comprise advanced on-chip variation (AOCV) timing analysis, common clock path pessimism removal (CPPR) timing analysis, a combination of both or any other technique that reflects manufacturing difference for clock nodes that are in common or not.

As shown, operation 308 begins with operation 310 determining clock tap assignments for a first clock sink of the particular device pair and the second clock sink.

In response to operation 310 determining that the first clock sink is assigned to a first clock tap of the plurality of clock taps and the second clock sink is not assigned to any clock taps, operation 308 continues with operation 312 updating (e.g., by modification) the netlist to assign the second clock sink to the first clock tap of the plurality of clock taps.

In response to operation 310 determining that the first clock sink and the second clock sinks are assigned to different clock taps, operation 308 continues with operation 314, where operations 316 through 320 are performed. As shown, operation 314 begins with operation 316 identifying a particular clock sink, from the first clock sink and the second clock sink, having a longest clock-device-to-clock-tap wire distance. Operation 314 continues with operation 318 determining a new clock tap assignment between the particular clock sink and a given clock tap, in the plurality of clock taps, that minimizes the longest clock-device-to-clock-tap wire distance.

Operation 314 then continues with operation 320 updating the netlist to assign both the first clock sink and the second clock sink to the given clock tap. For some embodiments, updating the netlist to assign both the first clock sink and the second clock sink to the given clock tap involves a maximum circuit-device-to-clock-tap distance value (D). The updating may comprise determining whether a first wired distance between the first clock sink and the given clock tap is at least less than the maximum circuit-device-to-clock-tap distance value, and determining whether a second wired distance between the second clock sink and the given clock tap is at least less than the maximum circuit-device-to-clock-tap distance value. Subsequently, the netlist may be updated to assign both the first clock sink and the second clock sink to the given clock tap only if each of the first wired distance and the second wired distance is at least less than the maximum circuit-device-to-clock-tap distance value (D).

Figure 4:
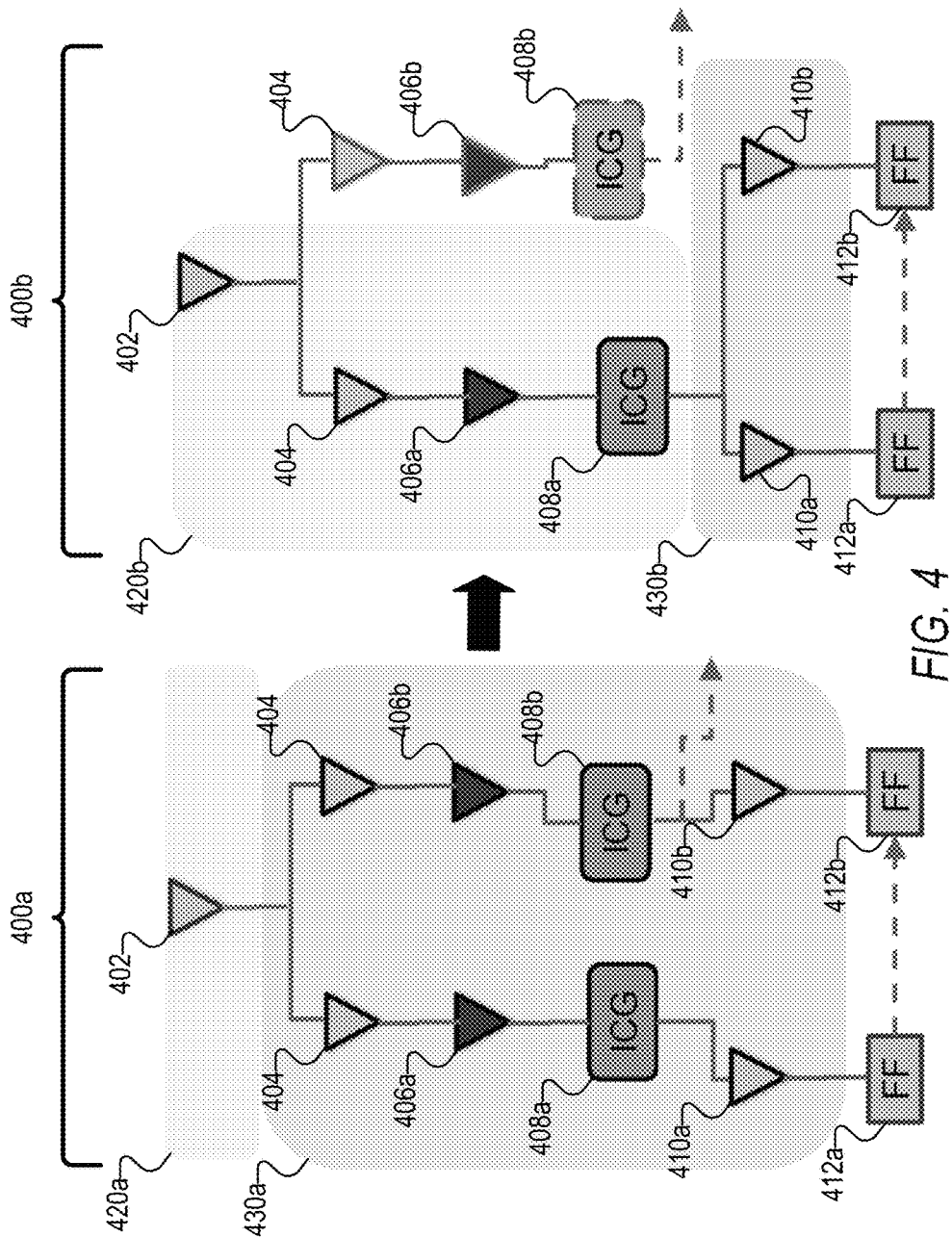
FIG. 4 shows diagrams illustrating an example clock tap assignment being applied to an example clock tree, according to some embodiments.

FIG. 4 shows diagrams illustrating an example clock tap assignment being applied to an example clock tree 400, according to some embodiments. The clock tree 400 comprises a clock source 402, drivers 404 and 410 (e.g., buffers or inverters), clock tap points 406, ICGs 408, and flip-flops 412. As shown, the flip-flops 412a and 412b are coupled together. FIG. 4 illustrates how clock tap assignments for a clock sink pair formed by the flip-flops 412a and 412b can be adjusted according to an embodiment such that they share the same clock tap point.

In particular, for the clock tree 400a, the flip-flop 412a is coupled to the ICG 408a, via the driver 410a, and the ICG 408a is coupled to the clock tap point 406a. Additionally, the flip-flop 412b is coupled to the ICG 408b, via the driver 410b, and the ICG 408b is coupled to the clock tap point 406b. Accordingly, the flip-flops 412a and 412b of the clock tree 400a are assigned to different clock tap points.

According to some embodiments, a method described herein for clock tap assignment based on timing analysis may analyze the clock tree 400a (e.g., as generated and optimized by a CTS process) and determine the clock tap assignments of the flip-flops 412a and 412b. In response to determining that the flip-flops 412a and 412b are assigned to different clock taps, the method may identify that between the flip-flop 412a and the flip-flop 412b, the flip-flop 412b has the longest wire distance between itself and its clock tap point 406b. The method may then determine the clock tap point 406a is the new clock tap assignment that minimizes the wire distance between the flip-flop 412b and its clock tap point 406b. The method may then assign (e.g., by updating the netlist of the circuit design) both the flip-flop 412a and the flip-flop 412b to the same clock tap point 406a. This is reflected in FIG. 4 by the clock tree 400b.

In FIG. 4, highlighted areas 420 indicate common clock paths within the clock tree 400, and highlighted areas 430 indicate divergent clock paths within the clock tree 400. As shown in FIG. 4, by assigning the clock taps in accordance with an embodiment, the common clock path 420a in the clock tree 400a is extended in the clock tree 400b (as represented by the common clock path 420b). In this way, some embodiments can promote common clock paths within the clock tree, which in turn may permit a circuit design using the resulting clock tree to safely operate at higher frequencies than otherwise possible.

Figure 5:
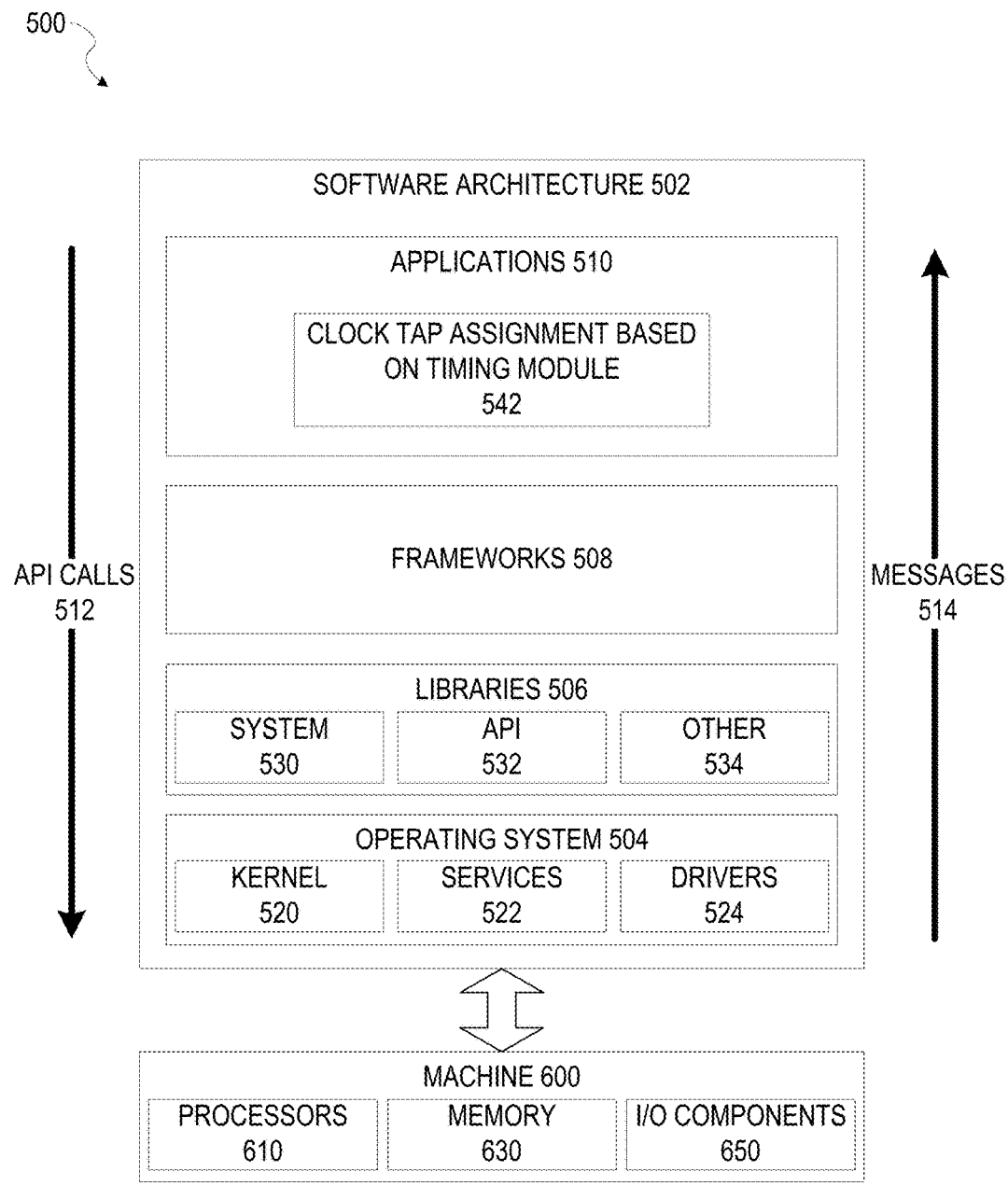
FIG. 5 is a block diagram illustrating an example of a software architecture that may be operating on an electronic design automation (EDA) computing device and may be used with methods for clock tap assignment based on timing, according to some embodiments.

FIG. 5 is a block diagram 500 illustrating an example of a software architecture 502 that may be operating on an EDA computer and may be used with methods for clock tap assignment based on timing, according to some example embodiments. The software architecture 502 can be used as an EDA computing device to implement any of the methods described above. Aspects of the software architecture 502 may, in various embodiments, be used to store circuit designs, and to assign clock taps based on timing in an EDA environment to generate circuit designs, from which physical devices may be generated.

FIG. 5 is merely a non-limiting example of a software architecture 502, and it will be appreciated that many other architectures can be implemented to facilitate the functionality described herein. In various embodiments, the software architecture 502 is implemented by hardware such as a machine 600 of FIG. 6 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, software frameworks 508, and applications 510. Operationally, the applications 510 invoke application programming interface (API) calls 512 through the software stack and receive messages 514 in response to the API calls 512, consistent with some embodiments. In various embodiments, any client device, any server computer of a server system, or any other device described herein may operate using elements of the software architecture 502. An EDA computing device described herein may additionally be implemented using aspects of the software architecture 502, with the software architecture 502 adapted for operating to perform routing a net of a circuit design in any manner described herein.

In one embodiment, an EDA application of the applications 510 performs clock tap assignment based on timing according to embodiments described herein using various modules within the software architecture 502. For example, in one embodiment, an EDA computing device similar to the machine 600 includes the memory 630 and the one or more processors 610. The processors 610 also implement a clock tap assignment based on timing in accordance with various embodiments described herein.

In various other embodiments, rather than being implemented as modules of the one or more applications 510, the clock tap assignment based on timing module 542 may be implemented using elements of the libraries 506, the operating system 504, or the software frameworks 508.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 such as libraries of blocks for use in an EDA environment or other libraries that can provide functions such as memory allocation functions, string manipulation functions, mathematic functions, and the like. In addition, the libraries 506 can include API libraries 532 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 may also include other libraries 534.

The software frameworks 508 provide a high-level common infrastructure that can be utilized by the applications 510, according to some embodiments. For example, the software frameworks 508 provide various graphic user interface (GUI) functions, high-level resource management, high-level location services, and so forth. The software frameworks 508 can provide a broad spectrum of other APIs that can be utilized by the applications 510, some of which may be specific to a particular operating system 504 or platform. In various embodiments, the systems, methods, devices, and instructions described herein may use various files, macros, libraries, and other elements of an EDA design environment to implement clock tap assignment based on timing as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 502, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 600 including processors 610), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

Figure 6:
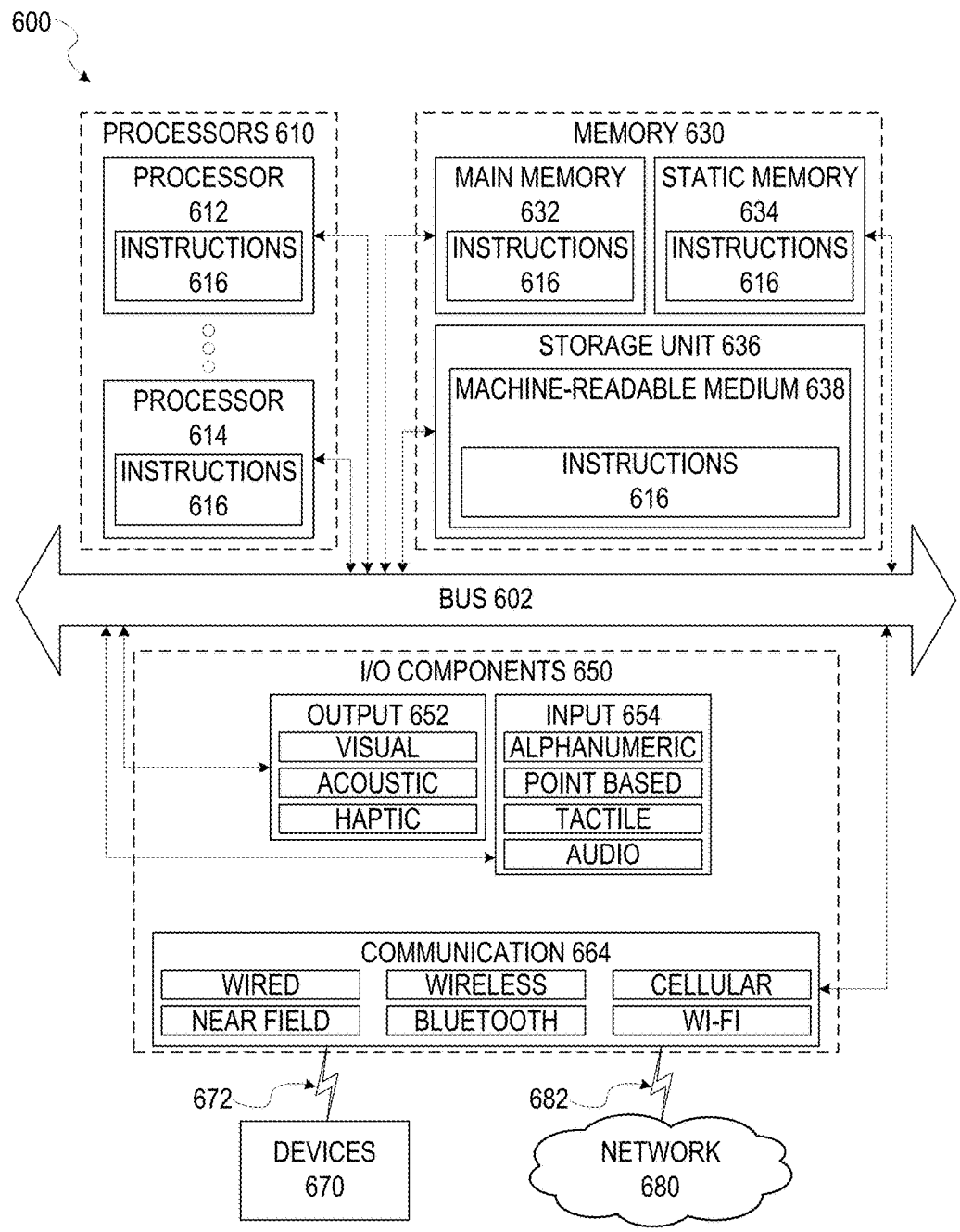
FIG. 6 is a diagram representing a machine in the form of a computer system within which a set of instructions are executed, causing the machine to perform any one or more of the methods discussed herein, according to some example embodiments.

FIG. 6 is a diagrammatic representation of the machine 600 in the form of a computer system within which a set of instructions may be executed for causing the machine 600 to perform any one or more of the methodologies discussed herein, according to an example embodiment. FIG. 6 shows components of the machine 600, which is, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute the instructions 616 contemporaneously. Although FIG. 6 shows multiple processors 610, the machine 600 may include a single processor 612 with a single core, a single processor 612 with multiple cores (e.g., a multi-core processor 612), multiple processors 610 with a single core, multiple processors 610 with multiple cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., the instructions 616) for execution by a machine (e.g., the machine 600), such that the instructions 616, when executed by one or more processors of the machine (e.g., the processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, the communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a USB).

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling.

Furthermore, the machine-readable medium 638 is non-transitory (in other words, not having any transitory signals) in that it does not embody a propagating signal. However, labeling the machine-readable medium 638 "non-transitory" should not be construed to mean that the machine-readable medium 638 is incapable of movement; the machine-readable medium 638 should be considered as being transportable from one physical location to another. Additionally, since the machine-readable medium 638 is tangible, the machine-readable medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method comprising:
    accessing, by one or more hardware processors, a netlist describing a circuit design that comprises a plurality of clock taps and a plurality of clock sinks wired to the plurality of clock sinks;
    performing, by the one or more hardware processors, a timing analysis on the circuit design;
    determining, by the one or more hardware processors, a set of clock sink pairs, each clock sink pair comprising at least two clock sinks of the plurality of clock sinks that are coupled together; and
    for each particular clock sink pair in the set of clock sink pairs, in an order determined by a timing result of the timing analysis:
        determining, by the one or more hardware processors, clock tap assignments for a first clock sink of the particular clock sink pair and a second clock sink of the particular clock sink pair;
        in response to determining that the first clock sink is assigned to a first clock tap of the plurality of clock taps and the second clock sink is not assigned to any clock taps by analysis of a previous clock sink pair; updating; by the one or more hardware processors, the netlist to assign the second clock sink to the first clock tap of the plurality of clock taps; and
        in response to determining that the first clock sink and the second clock sink are assigned to different clock taps:
            identifying, by the one or more hardware processors, a particular clock sink, from the first clock sink and the second clock sink; having a longest clock-device-to-clock-tap wire distance;
            determining, by the one or more hardware processors, a new clock tap assignment between the particular clock sink and a given clock tap, in the plurality of clock taps, that minimizes the longest clock-device-to-clock-tap wire distance; and
            updating, by the one or more hardware processors, the netlist to assign both the first clock sink and the second clock sink to the given clock tap.

2. The method of claim 1, wherein the order comprises a worst timing delay to a best timing delay between clock sinks.

3. The method of claim 1, wherein the timing analysis comprises at least one of advanced on-chip variation (AOCV) timing analysis or common clock path pessimism removal (CPPR) timing analysis.

4. The method of claim 1, wherein in response to determining that the first clock sink and the second clock sink are assigned to a same clock tap, maintaining the same clock tap assignment.

5. The method of claim 1, further comprising:
accessing, by the one or more hardware processors, a critical-slack threshold value, the determining the set of clock sink pairs comprising determining the set of clock sink pairs based on the critical-slack threshold value such that each clock sink pair in the set of clock sink pairs has a slack that is at least less than the critical-slack threshold value.

6. The method of claim 1, further comprising:
accessing, by the one or more hardware processors, a maximum circuit-device-to-clock-tap distance value, the updating the netlist to assign both the first clock sink and the second clock sink to the given clock tap comprising:
determining whether a first wired distance between the first clock sink and the given clock tap is at least less than the maximum circuit-device-to-clock-tap distance value;
determining whether a second wired distance between the second clock sink and the given clock tap is at least less than the maximum circuit-device-to-clock-tap distance value; and
updating the netlist to assign both the first clock sink and the second clock sink to the given clock tap only if each of the first wired distance and the second wired distance is at least less than the maximum circuit-device-to-clock-tap distance value.

7. The method of claim 1, wherein the method is performed after clock tree synthesis (CTS).

8. The method of claim 1, wherein the method is performed at least after, or as part of, routing optimization performed on the circuit design.

9. The method of claim 8, wherein the method is performed after CTS optimization.

10. The method of claim 9, wherein CTS is performed again based on one or more clock tap assignments performed by the method.

11. A device comprising:
a memory storing instructions and a circuit design described by a netlist; and
a hardware processor communicatively coupled to the memory and configured by instructions to:
perform a timing analysis on the circuit design, the circuit design comprising a plurality of clock taps and a plurality of clock sinks wired to the plurality of clock taps;
determine a set of clock sink pairs, each clock sink pair comprising at least two clock sinks of the plurality of clock sinks that are coupled together;
for each particular clock sink pair in the set of clock sink pairs, in an order determined by a timing result of the timing analysis:
determine clock tap assignments for a first clock sink of the particular clock sink pair and a second clock sink of the particular clock sink pair;
in response to determining that the first clock sink is assigned to a first clock tap of the plurality of clock taps and the second clock sink is not assigned to any clock taps, update the netlist to assign the second clock sink to the first clock tap of the plurality of clock taps; and
in response to determining that the first clock sink and the second clock sink are assigned to different clock taps:
identify a particular clock sink, from the first clock sink and the second clock sink, having a longest clock-device-to-clock-tap wire distance;
determine a new clock tap assignment between the particular clock sink and a given clock tap, in the plurality of clock taps, that minimizes the longest clock-device-to-clock-tap wire distance; and
update the netlist to assign both the first clock sink and the second clock sink to the given clock tap.

12. The device of claim 11, wherein the order comprises a worst timing delay to a best timing delay between clock sinks.

13. The device of claim 12, wherein the timing analysis comprises advanced on-chip variation (AOCV) timing analysis.

14. The device of claim 12, wherein the timing analysis comprises common clock path pessimism removal (CPPR) timing analysis.

15. The device of claim 12, wherein the plurality of clock sinks comprises at least one flip-flop device.

16. The device of claim 12, wherein the hardware processor is configured by the instructions further to:
access a critical-slack threshold value, the determining the set of clock sink pairs comprising determining the set of clock sink pairs based on the critical-slack threshold value such that each clock sink pair in the set of clock sink pair has a slack that is at least less than the critical-slack threshold value.

17. The device of claim 12; wherein the hardware processor is configured by the instructions further to:
access a maximum circuit-device-to-clock-tap distance value, the updating the netlist to assign both the first clock sink and the second clock sink to the given clock tap comprising:
determining whether a first wired distance between the first clock sink and the given clock tap is at least less than the maximum circuit-device-to-clock-tap distance value;
determining whether a second wired distance between the second clock sink and the given clock tap is at least less than the maximum circuit-device-to-clock-tap distance value; and
updating the netlist to assign both the first clock sink and the second clock sink to the given clock tap only if each of the first wired distance and the second wired distance is at least less than the maximum circuit-device-to-clock-tap distance value.

18. The device of claim 12, wherein the hardware processor is configured by the instructions further to perform clock tree synthesis (CTS) and CTS optimization prior to the performing the timing analysis on a circuit design.

19. The device of claim 18, wherein CTS is performed again based on one or more clock tap assignments performed by the hardware processor.

* * * * *